US012626539B2

(12) United States Patent
Benson et al.

(10) Patent No.: US 12,626,539 B2
(45) **Date of Patent: *May 12, 2026**

(54) SYSTEMS AND METHODS FOR DISTRIBUTED VISUALIZATION GENERATION

(71) Applicant: EMBARK TRUCKS, INC., San Francisco, CA (US)

(72) Inventors: Liam Benson, San Francisco, CA (US); Caleb Foust, San Francisco, CA (US)

(73) Assignee: EMBARK TRUCKS, INC., San Francisco, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 18/443,419

(22) Filed: Feb. 16, 2024

(65) Prior Publication Data

US 2024/0249564 A1 Jul. 25, 2024

Related U.S. Application Data

(63) Continuation of application No. 18/157,233, filed on Jan. 20, 2023, now Pat. No. 11,915,533.

(51) Int. Cl.
*G07C 5/00* (2006.01)
*G07C 5/06* (2006.01)

(52) U.S. Cl.
CPC ............... *G07C 5/008* (2013.01); *G07C 5/06* (2013.01)

(58) Field of Classification Search
None
See application file for complete search history.

(56) References Cited

U.S. PATENT DOCUMENTS 9,507,346 B1 11/2016 Levinson et al.

FOREIGN PATENT DOCUMENTS

| | | | |
|---|---|---|---|
| CN | 108700876 | B | 8/2021 |
| KR | 20200101517 | A | 8/2020 |
| KR | 20220072622 | A | 6/2022 |
| WO | 2022157025 | A | 7/2022 |

OTHER PUBLICATIONS

892 Form dated Jun. 30, 2023 which was received in connection with U.S. Appl. No. 18/157,233.
Notice of Allowance dated Oct. 18, 2023 which was received in connection with U.S. Appl. No. 18/157,233.
Businesswire (Aug. 20, 2020) : KeepTruckin Unveils New Safety Hub Powered by Innovative DRIVE Risk Score and AI Technology. Retrieved from https://www.youtube.com/watch?v=cL3mg09yDuc and retrieved on Jun. 26, 2023 (Year: 2020).
International Search Report and Written Opinion for International Patent App. No. PCT/US2024/012344, mailed May 13, 2024 (11 pages).

*Primary Examiner* — Abdhesh K Jha
(74) *Attorney, Agent, or Firm* — McDermott Will & Schulte LLP

(57) ABSTRACT

Provided are systems, methods and computer program code for generating a distributed visualization.

20 Claims, 10 Drawing Sheets

SYSTEMS AND METHODS FOR DISTRIBUTED VISUALIZATION GENERATION

CROSS REFERENCE

The present application is a non-provisional continuation of and claims priority to U.S. application Ser. No. 18/157,233, which was filed on Jan. 20, 2023, the entire content of which is incorporated by reference herein in its entirety.

BACKGROUND

Autonomous or semi-autonomous vehicles rely on a substantial amount of sensor and other vehicle data to understand the road, the state of the vehicle and the state of the environment around the vehicle. After the completion of such a vehicle's trip, technicians, analysts and other users frequently have a need to replay visualizations of portions of a trip. These visualizations often include a number of different types of data, from sensors, imaging devices, vehicle systems, or the like and it is difficult to generate videos including all this data.

SUMMARY

Provided are systems, methods and computer program code for distributed visualization generation of data associated with a portion of an autonomous or semi-autonomous vehicle trip. Some embodiments include a memory configured to store data associated with operation of a vehicle including data captured by at least a first sensor of the vehicle and a processor configured to receive a request to generate a visualization of the operation of the vehicle, the request including a starting timestamp and an ending timestamp, the request further including information identifying a user interface configuration; determining a number of worker nodes required to generate the visualization; provisioning the number of worker nodes and providing instructions to each worker node to cause each worker node to generate a portion of the visualization; reassembling the portions of the visualization into a final visualization; and delivering the visualization to at least a first user.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
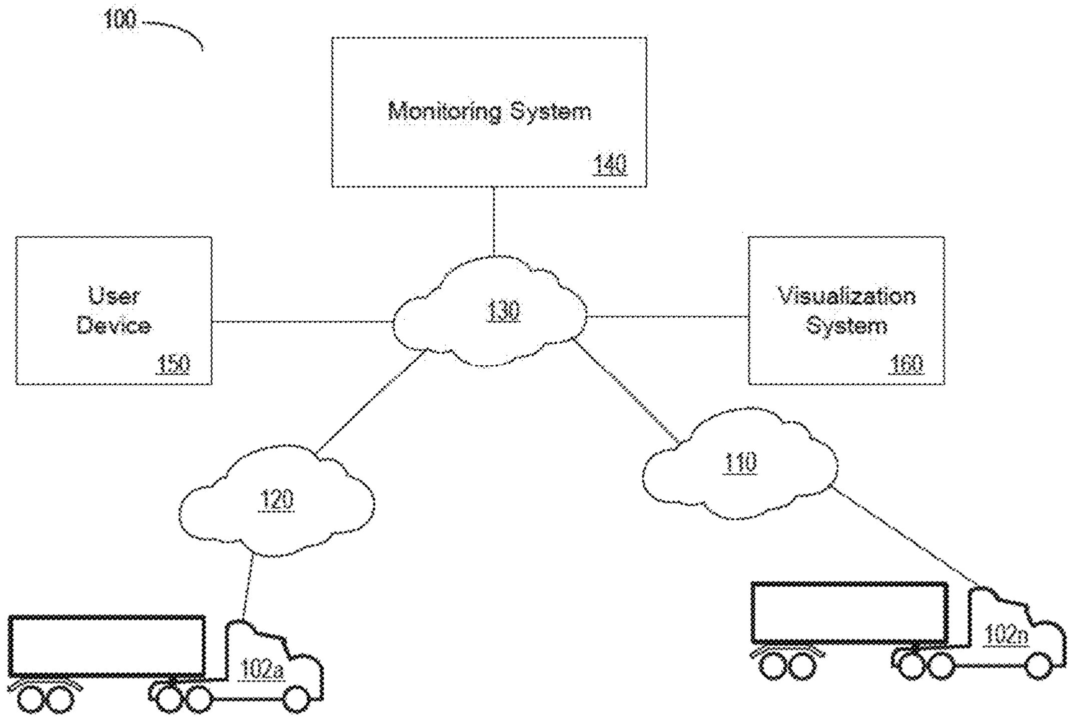
FIG. 1 is a diagram illustrating an example of a communication environment in which a semi-truck may operate pursuant to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Features of some embodiments will now be described by first referring to FIG. 1 which depicts features of a system pursuant to some embodiments. As shown in FIG. 1, a system 100 may include one or more semi-trucks 102*a-n* which are in communication with a remote monitoring system 140 via one or more networks 110, 120, 130. One or more user devices 150 may also be in communication with the remote monitoring system 140 (and, in some embodiments, with one or more semi-trucks 102) via one or more networks 110, 120, 130. One or more of the user devices 150 may also be in communication with a visualization system 160 to interact with data from the semi-trucks 102 after the conclusion of a trip or route. Pursuant to some embodiments, the semi-trucks 102 are autonomous or semi-autonomous vehicles that capture and generate a large amount of data as the semi-trucks 102 operate during a trip or route. For example, autonomous or semi-autonomous vehicles may generate, capture or otherwise produce vehicle diagnostic or operational data, image data (including videos, camera images and lidar data), position and navigational data, trajectory and positional data, object detection data, etc.

In some embodiments, some or all of this data is transmitted or otherwise uploaded to a data store (not shown in FIG. 1) for use in performing analyses of the data after a semi-truck 102 has completed a trip (the collected data for a specific trip of a specific semi-truck 102 will generally be referred to herein as "trip data"). Pursuant to some embodiments, a user operating a user device 150 may interact with the trip data via the visualization system 160. In some embodiments, the visualization system 160 may be implemented as a web server that allows a user to view trip data associated with one or more vehicles via a Web browser interface such as the interfaces shown and described below in conjunction with FIGS. 5A and 5B. Pursuant to some embodiments, a user operating a user device 150 interacting with the visualization system 160 may view or interact with short segments of the trip (e.g., such as 20 second segments of trip data). In some situations, it is desirable to create longer views of a trip (e.g., such as a selected hour of a trip). Embodiments allow the generation of longer segments, automatically producing a distributed visualization containing a number of short segments from a wide variety of data sources.

Features of such automatic generation of a distributed visualization will be described by reference to FIG. 2 (depicting a system for the automated creation of distributed visualizations pursuant to some embodiments that may be used in conjunction with a system such as the system of FIG. 1), FIGS. 3-4 (depicting methods of operating the system of FIG. 2), FIGS. 5A-5B (depicting a user interface to initiate the automated process of the present invention that may be presented to a user operating a user device such as the user device 150 of FIG. 1), FIG. 6 (depicting control systems and sensors that collect data associated with a semi-truck 102 during a trip that may be visualized and transformed into a distributed visualization pursuant to the present invention) and FIGS. 7A-7C (depicting selected components of a semi-truck 102 pursuant to some embodiments).

To introduce features of some embodiments, an illustrative example will now be provided. In the illustrative example, a number of semi-trucks are in operation, each making a trip. During the trip, each semi-truck generates a large amount of data (including vehicle diagnostic data, image data, sensor data, etc.). At the end of a trip, the data is uploaded to a datastore for use in evaluating or analyzing the performance of the vehicle and its systems during the trip. Some users may interact with short segments of data to analyze specific moments in time of a selected trip of a selected semi-truck. These analyses can be performed by a user operating a Web browser of a user device and a visualization service. If a user wishes to produce a visualization of a longer period of time (e.g., minutes or even hours of a trip), the user may request that a distributed visualization service be invoked to automatically generate the visualization. Pursuant to some embodiments, a user need only identify the desired starting and ending timestamps of the trip for a selected vehicle and the distributed visualization service will generate the visualization. In some embodiments, the user may also specify a desired service level in which the visualization will be produced (e.g., by specifying when the visualization is required to be completed). The distributed visualization service uses these inputs to determine a required amount of resources needed to produce the requested visualization within the specified time constraints and automatically provisions, deploys and administers the resources to generate the visualization. In this manner, embodiments allow visualizations to be efficiently produced. Once the visualization is produced, the visualization is made available to the user and the resources used to produce the visualization are decommissioned, thereby allowing the distributed visualization service to expand and contract as needed to save cost and resources.

Figure 2:
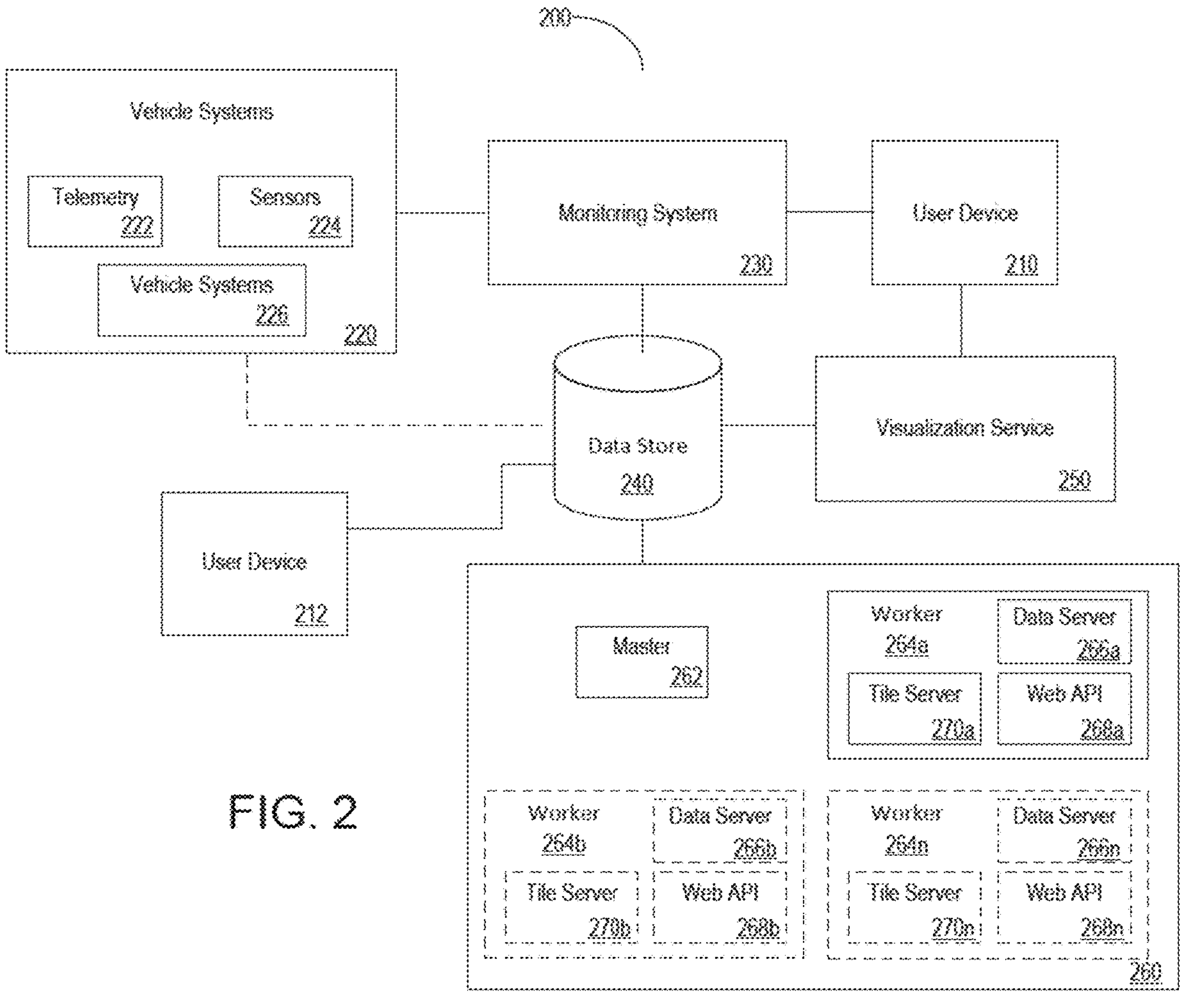
FIG. 2 is a diagram illustrating a system pursuant to some embodiments.

Reference is now made to FIG. 2 where a system diagram is shown which depicts a distributed visualization generation system 200 pursuant to some embodiments. As shown, the system 200 includes components or modules that interact to allow the generation of distributed visualizations of data from vehicle systems 220 from one or more semi-trucks 102 (not shown in FIG. 2). In some embodiments, data from vehicle systems 220 are provided to a data store 240 for storage and later retrieval for viewing by a user operating a user device 210 via a visualization service 250. The data store 240 may be, for example, a data warehouse or data lake. The data store 240 may include different data storage components. For example, some of the data from vehicle systems 220 may be stored in one or more relational, time series or noSQL databases, while image data may be stored in object datastores. Further, the visualizations produced by a distributed visualization service 260 may be stored in the data store 240 in object data storage locations (e.g., such as in Simple Storage Service "S3" object stores provided by Amazon Web Services or other similar data stores).

In some embodiments, the data from the vehicle systems 220 may be uploaded to the data store 240 in one or more batches after completion of a trip. In other embodiments, some or all of the data may be streamed or otherwise uploaded to the data store 240 during the performance of a trip. For simplicity and ease of exposition, embodiments will be described assuming that all of the relevant data from the vehicle systems 220 has been uploaded in a batch to the data store 240 after completion of a trip by a semi-truck 102. Further, the data from each semi-truck 102 is associated with information identifying the particular semi-truck 102 (e.g., using a vehicle identifier) and the specific trip (e.g., using a trip identifier).

In general, the vehicle systems 220 include components related to telemetry systems 222, sensors 224 and other vehicle systems 226. The vehicle systems 220 may include a number of other components including those shown and described further below in conjunction with FIG. 6. For the purposes of describing components related to the generation of distributed visualizations pursuant to some embodiments, only selected components are shown in FIG. 2. For example, while FIG. 2 only shows a single vehicle system 220, in practical application, a large number of vehicle systems 220 will provide data to the data store 240 for use in the system of the present invention. In practical application, multiple vehicle systems 220 and user devices 210, 212 will be provided.

The telemetry 222 systems may include systems or components that produce, modify, or otherwise generate telemetry data associated with the location, orientation, and movement of a semi-truck 102 during a trip. The sensors 224 may include systems or components that produce, modify or otherwise generate data about the semi-truck 102, objects around or on the semi-truck 102 as the vehicle conducts a trip. For example, sensor 224 data may include images obtained from lidars, cameras or other sensors mounted in or on the semi-truck 102. Other vehicle systems 226 may produce or otherwise generate data associated with the operation of the semi-truck 102 during a trip (e.g., such as engine operation data, weight, an operational mode of the vehicle, diagnostic data, etc.). Some or all of this data from the vehicle systems 220 may be stored with timestamps so that a view of the current status of the vehicle and its operation at any point during a trip may be obtained.

The system 200 includes one or more user devices 210, 212 that may be operated by users to interact with data from the data store 240. For example, some user devices 210 may interact with data from the data store 240 through one or more visualization services 250. In such interactions, a user may be presented with a user interface such as the user interfaces of FIGS. 5A and 5B which allow the user to select a desired vehicle and a desired trip to view. Once the user has selected vehicle and trip, the user may configure one or more tiles of the user interface to display different types of data associated with the vehicle and the trip. The user may then select a time stamp (or other location) during the trip to view data associated with the portion of the trip selected. Due to Web browser rendering limitations and large data volume sizes, the user may be limited to view short (e.g., 20 second) slices of data. Pursuant to some embodiments, the user may further interact with user device 210 to specify a longer time period and cause the distributed visualization service 260 to operate to generate a visualization of that longer time period (and, for example, to automatically create a video of that longer time period for later viewing). The visualization produced by the distributed visualization service 260 may be stored in a location in the data store 240 allowing other users (e.g., such as a user operating a user device 212) to view the video. In this manner, embodiments allow the automated creation of distributed visualizations including large amounts of data without requiring users to manually stitch together screen recordings of the data.

In some embodiments, the distributed visualization service 260 is invoked on demand (e.g., when a user operating a user device 210 requests the creation of a distributed visualization of a selected time period of a trip for a specific vehicle). Pursuant to some embodiments, the distributed visualization service 260 uses one or more worker nodes 264 which are created on demand (e.g., when a user operating a user device 210 requests the creation of a distributed visualization). A master node 262 may be used to coordinate the visualization tasks that will be performed by each of the worker nodes 264. For example, if a user operating user device 210 requests that a two-minute visualization of a portion of a trip by a vehicle be generated, the master node 262 may break the job into six (6) 20 second tasks and distribute those tasks among one or more worker nodes 264. For example, the master node 262 may break the job into individual tasks based on timestamps (where the first task is to generate a visualization from the starting timestamp to the $20^{th}$ second, the second task is to generate a visualization from the $20^{th}$ second to the $40^{th}$ second, and so on). In some embodiments, the number of worker nodes 264 provisioned to handle the job may depend on the speed at which the user needs the visualization returned (the "service level" or "SLA"). As a simple example, if the SLA is that the user needs the visualization completed in less than a minute, then the master node 262 may cause the job to be distributed among six worker nodes 264 (assuming each worker node needs at least 20 seconds to complete its assigned task).

The master node 262 (or other application software associated with the distributed visualization service 260) may calculate the number of tasks needed and the amount of computing resources needed to handle the tasks within the SLA and cause the provisioning of an appropriate number of worker nodes 264 to complete the job within the SLA. In some embodiments, the master node 262 is configured to coordinate all the tasks that are to be executed in a distributed manner. Each worker node 264 is given data with instructions regarding the specific tasks to be performed. For example, a first worker node 264*a* may be instructed to create a visualization of a portion of a trip for a specific vehicle starting at a specific timestamp and ending at a specific timestamp (e.g., 20 seconds later). The worker node 264*a* is given the starting and ending timestamps as well as information identifying the specific trip and vehicle. The worker node 264*a* is configured with a data server 266*a*, a tile server 270*a* and a Web API 268*a*. These components are configured to retrieve specific items of data from data store 240 associated with the timestamps, the trip and the vehicle.

For example, the data server 266*a* retrieves vehicle and telemetry data from the designated vehicle, trip and timestamps. The tile server 270*a* retrieves vehicle location and map data from the designated vehicle, trip and timestamps. The Web API 268*a* retrieves image and other data for virtual display in a headless browser associated with the worker node 268*a*. Together, the data from the data server 266*a*, the tile server 270*a* and the Web API 268*a* are virtually displayed or played in a headless Web browser for the duration of the task (e.g., from the task start timestamp to the task end timestamp) and a visualization of that task is rendered. Once the task has completed, the worker node 264*a* generates a visualization file (e.g., in a format such as .mp4 or the like).

In some embodiments, one or more worker nodes 264 are responsible for compiling a final visualization that includes some or all of the visualizations generated during the job. For example, in some embodiments, a worker node 264*a* may be operated to compile a visualization including all of the tasks performed by that worker node 264*a* during the job, and then is tasked to provide that composite visualization to another worker node 264 to add its visualizations to the composite visualization. In this way, a sequence of composite visualizations may be stitched together to form a final visualization file from all of the worker nodes 264. In some embodiments, the master node 262 (or other code associated with the distributed visualization service 260) may be tasked with compiling the final visualization file. Pursuant to some embodiments, the master node 262 and the worker nodes 264 may be Apache Spark nodes. The master node 262 and worker nodes 264 can be implemented, for example, as Java applications. In some embodiments, the master node 262 is configured to receive requests (e.g., jobs) from the visualization service 250 (as will be described below in conjunction with FIG. 4). The master node 262 is configured to break down the job into smaller chunks (tasks) and distribute the work to the various worker nodes 264. In some embodiments, when a worker 264 completes its portion of the job, it returns the results to the master 262.

In some embodiments, once all of the worker nodes 264 return their respective results, the master node 262 compiles all of the worker results and causes the final resulting visualization file to be stored in the data store 240 (e.g., in an object store). In some embodiments, the resulting visualization file may be stored in some other accessible location. In some embodiments, the master node 262 may further be responsible for ensuring a notification is transmitted to the user who initially requested the visualization (and/or any other users who were registered to receive the visualization file). In some embodiments, the notification may include a link to access or retrieve the visualization file. The master node 262 may further be responsible for naming the visualization file pursuant to a file naming convention (e.g., indicating the trip, the vehicle and the starting and ending timestamps). As discussed above, instead of the master node 262 performing such final processing, a worker node 264 may be responsible for generating the final visualization file, naming the file, causing it to be stored, and notifying the user(s).

Figure 3:
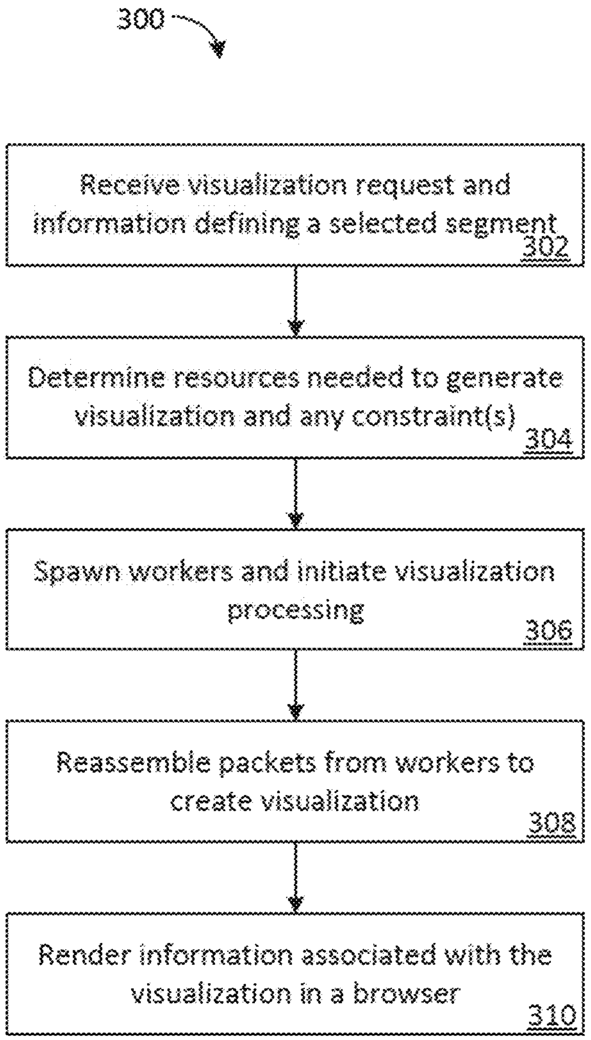
FIG. 3 is a flow diagram illustrating a process pursuant to some embodiments.

FIG. 3 illustrates a process 300 for generating a distributed visualization pursuant to some embodiments of the present invention. The process 300 may be performed, for example, using a distributed visualization system such as the system 200 of FIG. 2. The flow charts described herein do not imply a fixed order to the steps, and embodiments of the present invention may be practiced in any order that is practicable. Note that any of the methods or processes described herein may be performed by hardware, software, or any combination thereof. For example, a computer-readable storage medium may store thereon instructions that, when executed by a machine or processor, result in performance according to any of the embodiments described herein.

Process 300 begins at 302 where a distributed visualization service 260 receives a visualization request including information identifying a selected segment of a trip by a specific vehicle. This information may be received from a user interaction with a user device 210 (e.g., such as shown in the user interface of FIG. 5). For example, a user may interact with a user interface to select a vehicle and a trip and also to arrange one or more tiles or frames on the user interface to display data from the vehicle and the trip in a desired way. The user may also interact with the user interface to select a desired start time and end time for a visualization.

Processing continues at 304 where the distributed visualization service 260 determines the resources needed to generate the visualization as well as any constraints. Further details of the processing are described below in conjunction with FIG. 4. In general, processing at 304 includes determining the number of worker nodes 264 that are required to generate the visualization in the required time.

Processing continues at 306 where the distributed visualization service 260 spawns or deploys the number of worker nodes 264 required to generate the visualization. Processing at 306 includes generating instructions for each worker node 264 (e.g., including start and end timestamps for each task to be performed) so that each worker node 264 can begin processing. Processing continues at 308 where the distributed visualization service 260 performs processing to reassemble the packets or segments created by each worker node 264 into a final visualization. As discussed above, in some embodiments, the master node 262 is responsible for reassembling the segments created by each worker node 264. In some embodiments, worker nodes 264 are tasked with assembling the segments into a final visualization.

Processing continues at 310 where the distributed visualization service 260 delivers the final visualization to a storage location (e.g., in the data store 240 or other location) and notifies the requesting user (or any other users specified by the requesting user) of the location so that those users can view the visualization.

Figure 4:
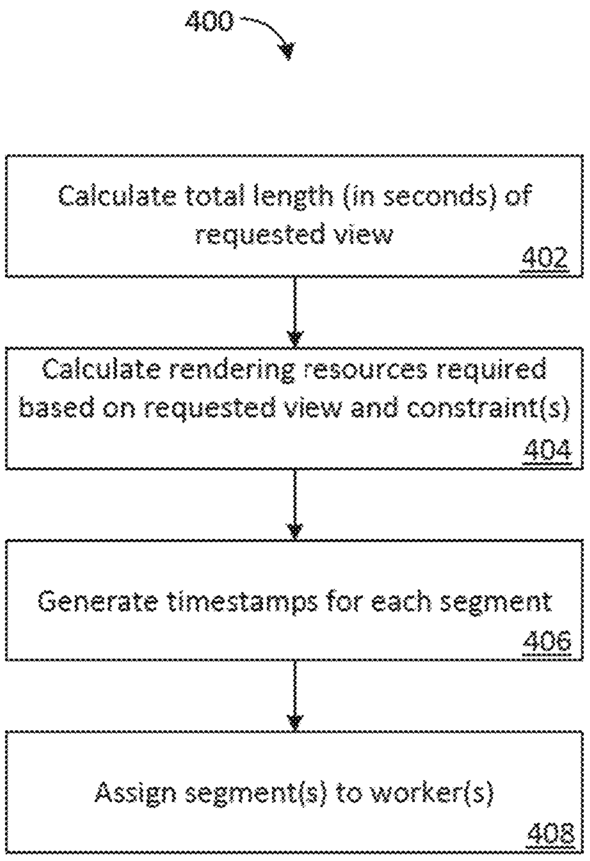
FIG. 4 is a flow diagram illustrating a further process pursuant to some embodiments.

Reference is now made to FIG. 4 where a process 400 is shown which may be performed in conjunction with the process 300 of FIG. 3. For example, the process 400 includes steps that may be performed by components of the system 200 of FIG. 2 in response to a user's request to generate a distributed visualization. For example, the process 400 may include processing by the distributed visualization service 260 upon receipt of a user's request to generate a distributed visualization of a portion of a trip involving a specific vehicle. The process 400 begins at 402 where the distributed visualization service 260 calculates the total length of the requested portion of the trip. In some embodiments the total length is calculated in seconds by subtracting the starting time stamp from the ending time stamp of the requested segment.

Processing continues at 404 where the service 260 calculates the rendering resources required based on the selected segment and any other constraint(s). For example, if the user who requested the visualization specified a desired SLA, processing at 404 may include calculating the resources required to render the requested visualization within the SLA time period.

Processing continues at 406 where the service 260 generates timestamps for each portion or segment of the desired visualization. For example, in some embodiments, the requested view will be broken into a number of 20 second segments for assignment to worker nodes. Processing continues at 408 where the service 260 assigns segment(s) (or tasks) to one or more worker nodes 264. The assignment of segments or tasks is performed based on the number of rendering resources determined to be required (at step 404) as well as the number of segments determined at 406. Each worker 264 may be assigned more than one task or segment. The assignment of segments to the workers at 408 may include processing by the master node 262 to cause the deployment of the desired number of worker nodes 264 as well as the communication of task instructions to those worker nodes 264 (e.g., including instructions regarding the timestamps of each job, etc.).

Figure 5A:
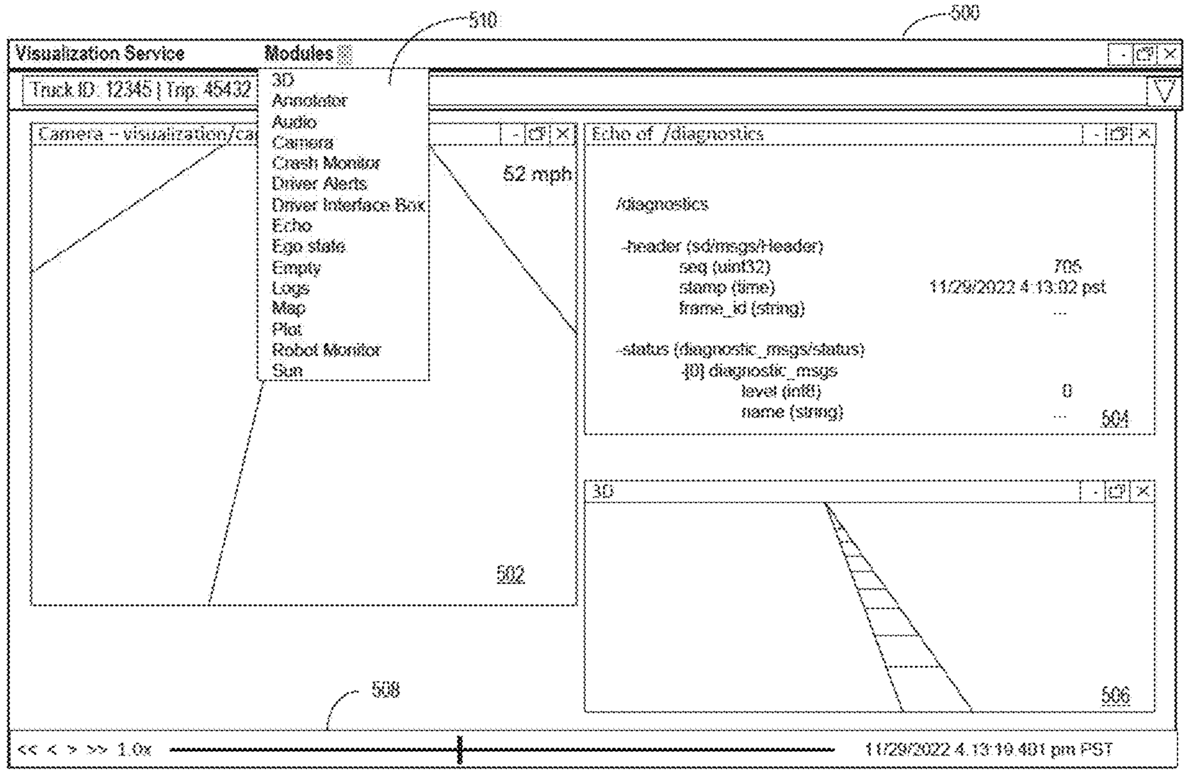
FIGS. 5A and 5B are diagrams illustrating a user interface that may be used to generate a distributed visualization pursuant to some embodiments.
Figure 5B:
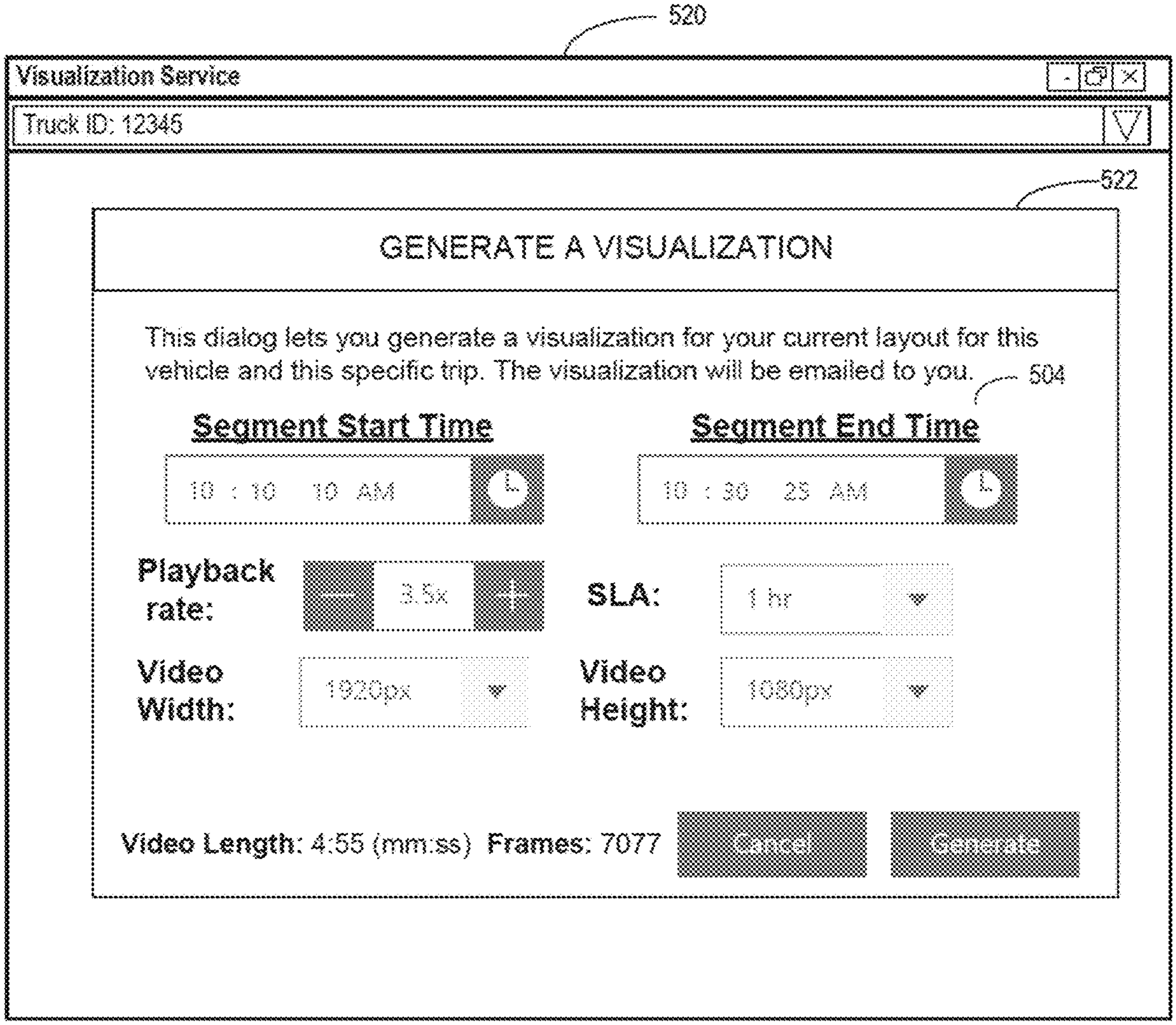

FIG. 5A illustrates an interactive user display 500 in accordance with some embodiments. The display 500 may be viewed by user operating user devices 210 to interact with data associated with trips conducted by semi-trucks 102. For example, the display 500 may be displayed on a display device of a user device 210 or a display device associated with the visualization service 250. In general, the display 500 may be accessed by any authenticated user via an http or https connection. In the example embodiment depicted in FIG. 5, the display includes a number of areas or frames which display different items of data. For example, as shown, the display 500 includes three frames 502, 504 and 506 which have been selected by a user to display different items of data associated with a specific vehicle on a selected trip. In the illustrative interface, frame 502 depicts data from a camera, frame 504 depicts a feed of diagnostic data, and frame 406 depicts a 3D view. Pursuant to some embodiments, users interacting with the display 500 may select different data sources from a selection of available modules 510 for display in different frames on the display 500. Users may resize, move and reconfigure each of the frames to create a desired display. The data and information displayed in each of the frames is synchronized (e.g., the data in the camera frame 502 is synchronized by time with the data displayed in the diagnostics frame 504 and the data displayed in the 3D frame 506).

In some embodiments, the different display areas may be resized and repositioned by a user by dragging each area to different locations within the display 500. Some or all of the display areas may be configured to display data associated with a vehicle and a trip.

A user interacting with the display 500 may interact with configuration options to select different data sources (e.g., such as different camera views). While a number of different types of data sources may be fed to display areas, a few examples include: a fusion map view displaying the vehicle's orientation, speed, mode of operation, lane position, one or more status alerts indicating status changes (e.g., such as an alert when a lane change is being initiated or when a lane change has been completed), monitor alerts (e.g., such as diagnostic or hardware alerts that should be reviewed), a map view showing the vehicle's route and location, etc. Because the vehicle may have multiple sensors (e.g., such as multiple cameras with different orientations), the user may further select a specific view from a specific sensor (e.g., such as the front-left camera, or rear-right lidar, etc.).

In this way, a user interacting with the visualization service 250 can configure user interfaces that display data in a desired manner (e.g., a user interested in viewing data from a forward-facing camera on the vehicle may display that data in conjunction with diagnostic data or ego state data to analyze different aspects of the trip).

Once a user has configured the interface in a desired manner, the user may request that a distributed visualization be generated of the interface and the vehicle data during a selected period of time. Such a request may be submitted, for example, using an interface such as the interface 520 shown in FIG. 5B. For example, a user may configure one or more parameters (e.g., by interacting with a modal or pop-up window that is presented over the user interface 500 of FIG. 5A) to select a desired time frame (specifying a start timestamp and an end timestamp), a requested SLA (identifying how quickly the visualization is needed). Other options may also be configured such as a selection of what user(s) should be notified once the visualization has been generated. Pursuant to some embodiments, once the user requests the generation of a visualization, details regarding the request as well as details regarding the configuration and layout of the user interface 500 are transmitted to the distributed visualization service 260 (shown in FIG. 2). The information regarding the configuration and layout of the user interface 500 may be transmitted as, for example, in a format such as JavaScript Object Notation (JSON), a markup language (such as "yet another markup language" or YAML) or the like. When the distributed visualization service 260 assigns segment(s) to worker(s) (e.g., in step 408 of process 400), the distributed visualization service 260 also provides the details of the configuration and layout of the user interface 500 so that each worker node 264 can generate its assigned segment(s) in the requested layout. For example, each worker node 264 may interact with the data from the datastore using a headless browser, where the headless browser is configured to replicate the user interface layout in the request.

For example, in embodiments where the user interface layout is communicated using a JSON object, the JSON object may specify: a version of the layout, a definition of one or more tabs to be displayed, a title of each tab, an identifier of each tab, an indicator of which tab is the active tab, a layout of each tab (e.g., including information identifying the size and position of each frame displayed in a tab as well as information identifying the module providing data for each frame), and meta-data associated with the layout (e.g., such as a version number, date modified, date created, etc.). The source of data for each frame may be a specific channel or feed of data or some other source of data. In this manner, embodiments allow a user interacting with a user device 210 to visually create a desired user interface layout with desired data from the vehicle and the trip and instruct the visualization service to generate a visualization which uses that specific layout and data. Further, the visualization service may enlist a number of worker nodes to generate segments of that visualization so that the visualization may be generated within a desired SLA.

Figure 6:
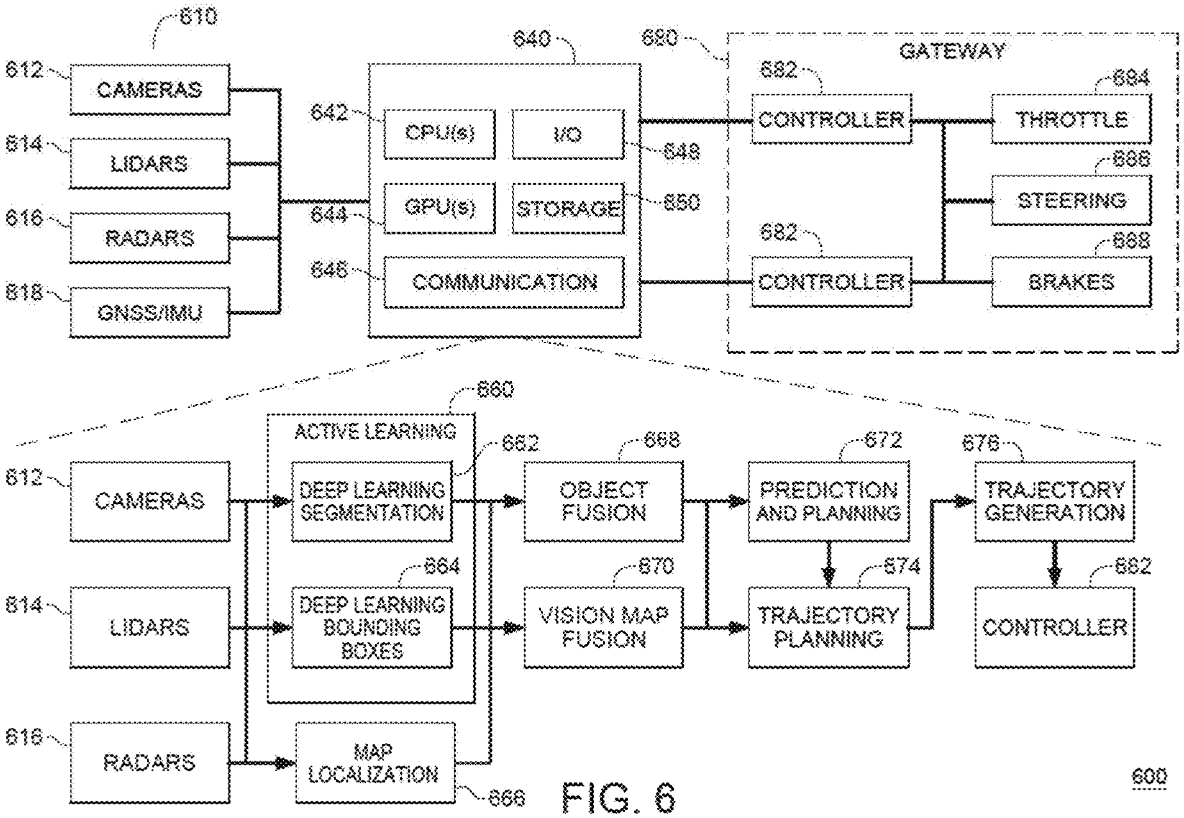
FIG. 6 is a diagram illustrating a control system that may be deployed in a vehicle such as the semi-truck depicted in FIGS. 7A-7C, in accordance with an example embodiment.
Figure 7A:
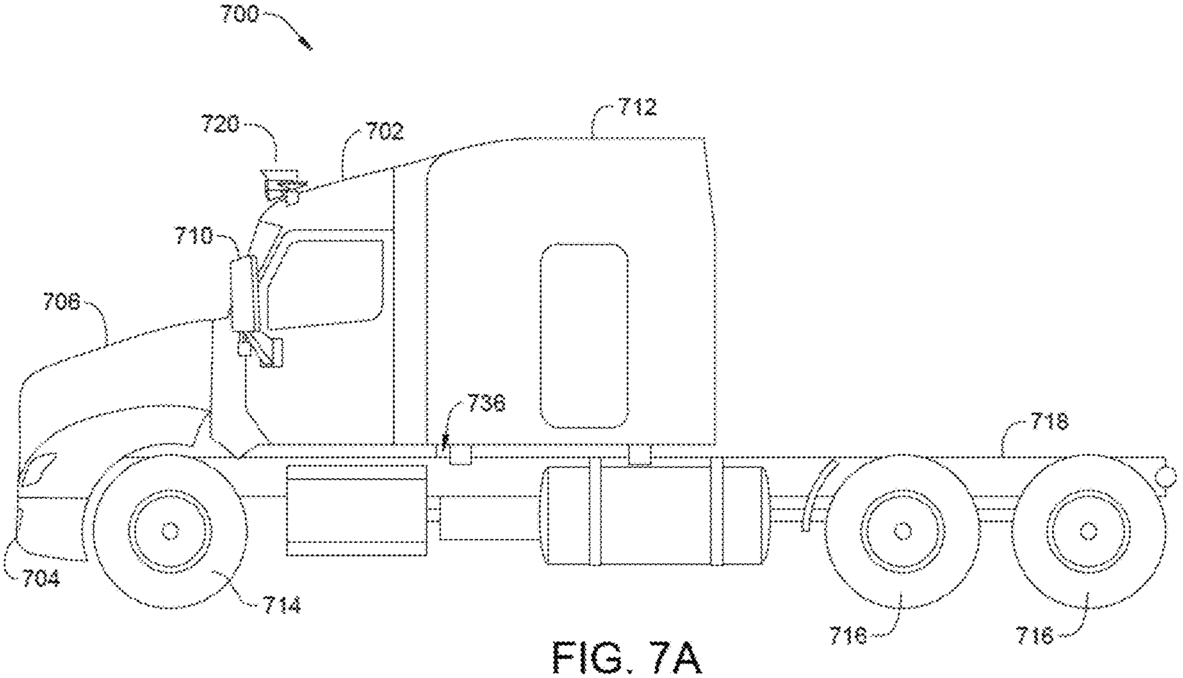
FIGS. 7A-7C are diagrams illustrating exterior views of a semi-truck that may be used in accordance with example embodiments.
Figure 7B:
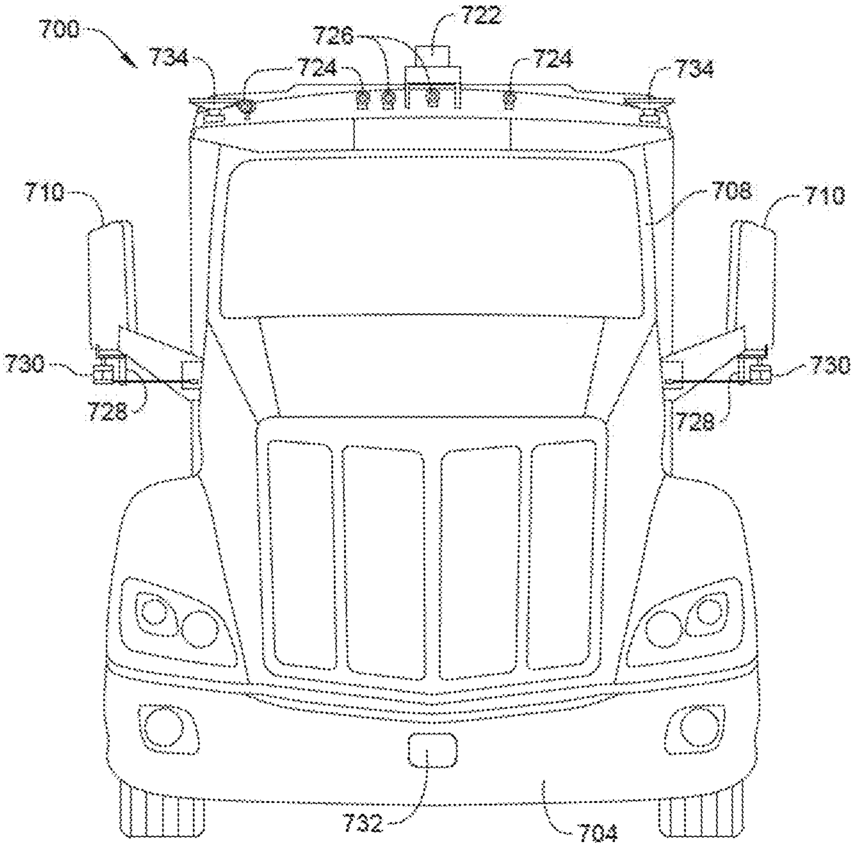
Figure 7C:
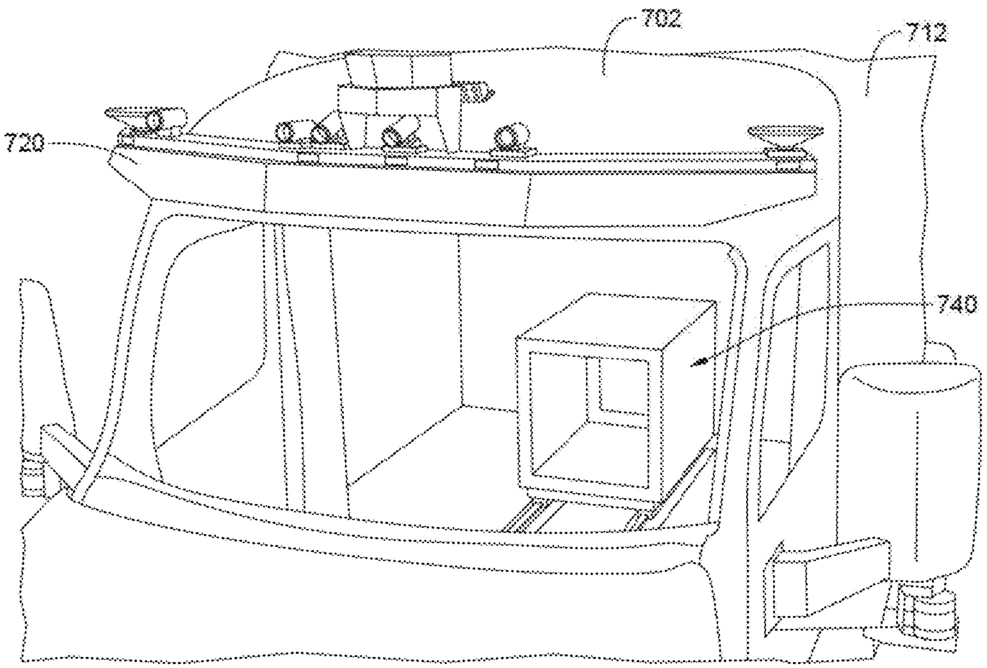

FIG. 6 illustrates a control system 600 that may be deployed in a vehicle such as the semi-truck 700 depicted in FIGS. 7A-7C, in accordance with an example embodiment. Referring to FIG. 6, the control system 600 may include a number of sensors 610 which collect data and information provided to a central computer system 640 to perform operations including, for example, control operations which control components of the vehicle via a gateway 680. Pursuant to some embodiments, the gateway 680 is configured to allow the central computer system 640 to control a number of different components from different manufacturers.

The central computer system 640 may be configured with one or more central processing units (CPUs) 642 to perform processing to implement features of embodiments of the present invention as described elsewhere herein as well as to receive sensor data from sensors 610 for use in generating control signals to control one or more actuators or other controllers associated with systems of the vehicle (including, for example, actuators or controllers allowing control of a throttle 684, steering systems 686, brakes 688 or the like). In general, the control system 600 may be configured to operate the semi-truck 700 in an autonomous (or semi-autonomous) mode of operation.

For example, the control system 600 may be operated to capture images from one or more cameras 612 mounted on various locations of the semi-truck 700 and perform processing (such as image processing) on those images to identify objects proximate or in a path of the semi-truck 700. Further, one or more lidar 614 and radar 616 sensors may be positioned to sense or detect the presence and volume of objects proximate or in the path of the semi-truck 700.

Other sensors may also be positioned or mounted on various locations of the semi-truck 700 to capture other information such as position data. For example, the sensors may include one or more satellite positioning sensors and/or inertial navigation systems such as GNSS/IMU 618. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 618 sensors may be used in conjunction with features of the present invention. The data collected by each of these sensors may be processed by the computer system 640 to generate control signals that control the operation of the semi-truck 700. The images and location information may be processed to identify or detect objects around or in the path of the semi-truck 700 and control signals may be emitted to adjust the throttle 684, steering 686 or brakes 688 as needed to safely operate the semi-truck 700. The computer system 640 may include computer code which operates to perform a process such as the process 300 of FIG. 3 to transmit data from the semi-truck 700 to a remote monitoring system using a low bandwidth protocol. The computer system 640 may also cause control information to be received (and acted upon) from the remote monitoring system such as via an inbound command node 214. While illustrative example sensors and actuators or vehicle systems are shown in FIG. 6, those skilled in the art, upon reading the present disclosure, will appreciate that other sensors, actuators or systems may also be used.

The control system 600 may include a computer system 640 (such as a computer server) which is configured to provide a computing environment in which one or more software or control applications (such as items 660-682) may be executed to perform the processing described herein.

In some embodiments, the computer system 640 includes components which are deployed on a semi-truck 700 (e.g., they may be deployed in a systems rack 740 positioned within a sleeper compartment 712 as shown in FIG. 7C). The computer system 640 may be in communication with other computer systems (not shown in FIG. 6, but shown as items 260, 270 and 290 of FIG. 2) that may be remote from the semi-truck 700 (e.g., the computer systems may be in communication via a network connection).

According to various embodiments described herein, the computer system 640 may be implemented as a server. In some embodiments, the computer system 640 may configured using any of a number of well-known computing systems, environments, and/or configurations such as, but not limited to, personal computer systems, cloud platforms, server computer systems, thin clients, thick clients, handheld or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 640 and the control system 600. For example, as shown, applications may be provided which perform active learning machine processing (active learning component 660) to process images captured by one or more cameras 612 and information obtained by lidars 614. For example, image data may be processed using deep learning segmentation models 662 to identify objects of interest in those images (such as, for example, other vehicles, construction signs, etc.). Here, deep learning segmentation may be used to identity lane points within the lidar scan. As an example, the system may use an intensity based voxel filter to identify lane points within the lidar scan.

Lidar data may be processed by the machine learning applications 664 to draw or identify bounding boxes on image data to identify objects of interest located by the lidar sensors. Information output from the machine learning applications may be provided as inputs to object fusion 668 and vision map fusion 670 software components which may perform processing to predict the actions of other road users and to fuse local vehicle poses with global map geometry in real-time, enabling on-the-fly map corrections. For example, data from object fusion 668 may be used as the source of tracked object data that may be transmitted from the semi-truck 700 to one or more remote monitoring systems using low bandwidth techniques of the present invention.

The outputs from the machine learning applications may be supplemented with information from radars 616 and map localization 666 application data (as well as with positioning data). These applications allow the control system 600 to be less map reliant and more capable of handling a constantly changing road environment. Further, by correcting any map errors on the fly, the control system 600 can facilitate safer, more scalable and more efficient operations as compared to alternative map-centric approaches. Information is provided to prediction and planning application 672 which provides input to trajectory planning 674 components allowing a trajectory 676 to be generated in real time based on interactions and predicted interactions between the semi-truck 700 and other relevant vehicles in the environment. The generated trajectory 676 may be the source of a computed trajectory of the vehicle which may be transmitted to one or more remote monitoring systems using the low bandwidth features of the present invention. In some embodiments, for example, the control system 600 generates a sixty second planning horizon, analyzing relevant actors and available trajectories. The plan that best fits multiple criteria (including safety, comfort and route preferences) is selected and any relevant control inputs needed to implement the plan are provided to controllers 682 to control the movement of the semi-truck 700.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computer system 640 which may represent or be integrated in any of the above-described components, etc. FIG. 6 is not intended to suggest any limitation as to the scope of use or functionality of embodiments of the application described herein. The computer system 640 is capable of being implemented and/or performing any of the functionality set forth hereinabove.

The computer system 640 may be described in the general context of computer system-executable instructions, such as program modules, being executed by a computer system. Generally, program modules may include routines, programs, objects, components, logic, data structures, and so on that perform particular tasks or implement particular abstract data types. The computer system 640 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 640 is shown in the form of a general-purpose computing device. The components of the computer system 640 may include, but are not limited to, one or more processors (such as CPUs 642 and GPUs 644), a communication interface 646, one or more input/output interfaces 648 and one or more storage devices 650. Although not shown, the computer system 640 may also include a system bus that couples various system components including system memory to the CPUs 642. In some embodiments, the input/output interfaces 648 may also include a network interface. For example, in some embodiments, some or all of the components of the control system 600 may be in communication via a controller area network ("CAN") bus or the like.

The storage device 650 may include a variety of types and forms of computer readable media. Such media may be any available media that is accessible by computer system/server, and it may include both volatile and non-volatile media, removable and non-removable media. The storage device 650 may include storage components such as the storage device 204 of FIG. 2. System memory, in one embodiment, implements the flow diagrams of the other figures. The system memory can include computer system readable media in the form of volatile memory, such as random access memory (RAM) and/or cache memory. As another example, storage device 650 can read and write to a non-removable, non-volatile magnetic media (not shown and typically called a "hard drive"). Although not shown, the storage device 650 may include one or more removable non-volatile disk drives such as magnetic, tape or optical disk drives. In such instances, each can be connected to the bus by one or more data media interfaces. Storage device 650 may include at least one program product having a set (e.g., at least one) of program modules that are configured to carry out the functions of various embodiments of the application.

FIGS. 7A-7C are diagrams illustrating exterior views of a semi-truck 700 that may be used in accordance with example embodiments. Referring to FIGS. 7A-7C, the semi-truck 700 is shown for illustrative purposes only—those skilled in the art, upon reading the present disclosure, will appreciate that embodiments may be used in conjunction with a number of different types of vehicles. The example semi-truck 700 shown in FIGS. 7A-7C is one configured in a common North American style which has an engine 706 forward of a cab 702, a steering axle 714 and two drive axles 716. A trailer (not shown) is attached to the semi-truck 700 via a fifth-wheel trailer coupling that is provided on a frame 718 positioned over the drive axles 716. A sleeper compartment 712 is positioned behind the cab 702. A number of sensors are positioned on different locations of the semi-truck 700. For example, sensors may be mounted on a roof of the cab 702 on a sensor rack 720. Sensors may also be mounted on side mirrors 710 as well as other locations. As will be discussed, sensors may be mounted on the bumper 704 as well as on the side of the cab 702 or other locations. For example, a rear-facing radar 736 is shown as mounted on a side of the cab 702 in FIG. 7A. Embodiments may be used with other configurations of trucks or other vehicles (e.g., such as semi-trucks having a cab over or cab forward configuration or the like). For example, embodiments may be used in conjunction with other types of vehicles that tow a trailer to allow improved information about trailer orientation. In general, and without limiting embodiments of the present invention, features of the present invention may be used with desirable results in vehicles that carry cargo over long distances, such as long-haul semi-truck routes.

FIG. 7B is a front view of the semi-truck 700 and illustrates a number of sensors and sensor locations. The sensor rack 720 may secure and position several sensors including a long range lidar 722, long range cameras 724, GPS antennas 734, and mid-range front facing cameras 726. The side mirrors 710 may provide mounting locations for rear-facing cameras 728 and mid-range lidar 730. A front radar 732 may be mounted on the bumper 704. It will be appreciated to one of skill in the art that sensors may be mounted or installed on other locations and the types of sensors at various locations are not limited to the exemplary embodiments therein as the locations, sensor types and mounts depicted in FIGS. 7A-7C are for illustrative purposes only. Referring now to FIG. 7C, a partial view of the semi-truck 700 is shown which shows an interior of the cab 702 and the sleeper compartment 712. In some embodiments, portions of the control system 600 of FIG. 6 are deployed in a systems rack 740 in the sleeper compartment 712, allowing easy access to components of the control system 600 for maintenance and operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A visualization generation system, comprising:

a memory configured to store data captured by at least a first sensor of a vehicle; and a processor configured to:

receive a request to generate a visualization of an operation of the vehicle, the request including a starting timestamp and an ending timestamp, the request further including information specifying a desired service level within which the visualization is to be generated;

determine a plurality of worker nodes required to generate the visualization within the desired service level;

provision the plurality of worker nodes and provide instructions to each worker node to cause each worker node to generate a portion of the visualization;

reassemble the portions of the visualization into a final visualization; and deliver the final visualization to at least a first user.

2. The visualization system of claim 1, wherein the request to generate the visualization of the operation of the vehicle further includes information identifying a user interface configuration, wherein delivering the final visualization to the at least first user further includes delivering the final visualization based at least in part on the user interface configuration.

3. The visualization system of claim 2, wherein the information identifying a user interface configuration includes information identifying at least a first frame to be displayed in a user interface, the at least first frame displaying a selected type of data associated with the operation of the vehicle.

4. The visualization system of claim 3, wherein the information identifying a user interface configuration includes information identifying at least a second frame to be displayed in the user interface, the at least second frame displaying a second selected type of data associated with the operation of the vehicle.

5. The visualization system of claim 1, wherein each worker node is provisioned with one or more of a headless browser application, a data server, a Web API and a tile server.

6. The visualization system of claim 5, wherein the instructions to each worker node include at least a starting timestamp of a portion of the visualization and an ending timestamp of the portion of the visualization.

7. The visualization system of claim 2, wherein the information identifying a user interface configuration is provided in a data storage object.

8. The visualization system of claim 7, wherein the data storage object includes information identifying a title, a layout including an arrangement and position of one or more frames, and a source of data for display in each of the one or more frames.

9. The visualization system of claim 8, wherein each worker node uses the data storage object to render a user interface in a headless browser.

10. A method for generating a visualization of a selected segment of a trip of a vehicle, comprising:

receiving a request to generate a visualization of the selected segment of the trip by the vehicle, the request including a starting timestamp and an ending timestamp, the request further including information specifying a desired service level within which the visualization is to be generated;

determining a plurality of worker nodes required to generate the visualization within the desired service level;

provisioning the plurality of worker nodes and providing instructions to each worker node to cause each worker node to generate a portion of the visualization;

reassembling the portions of the visualization into a final visualization; and providing the final visualization to at least a first user based at least in part on a user interface configuration.

11. The method of claim 10, further comprising:

receiving information selecting a trip and a vehicle.

12. The method of claim 11, wherein the information selecting a trip and a vehicle and the request to generate a visualization are received from a user operating a user device displaying a desired user interface configuration, and wherein the information identifying the user interface configuration is provided in a data storage object.

13. The method of claim 10, wherein the request to generate the visualization of the selected segment of the trip of the vehicle further includes information identifying a user interface configuration, wherein providing the final visualization to the at least first user further includes providing the final visualization based at least in part on the user interface configuration.

14. The method of claim 13, wherein the information identifying a user interface configuration includes information identifying at least a first frame, the at least first frame displaying a selected type of data associated with the selected segment of the trip of the vehicle.

15. The method of claim 14, wherein the information identifying a user interface configuration includes information identifying at least a second frame, the at least second frame displaying a second selected type of data associated with the selected segment of the trip of the vehicle.

16. The method of claim 10, wherein each worker node is provisioned with a headless browser application, a data server, a Web API and a tile server.

17. The method of claim 16, wherein the instructions to each worker node include at least a starting timestamp of a portion of the visualization and an ending timestamp of the portion of the visualization.

18. A non-transitory machine-readable medium storing instructions that, when executed by at least one programmable processor, cause the at least one programmable processor to perform operations comprising:

receiving a request to generate a visualization of a selected segment of a trip by a vehicle, the request including a starting timestamp and an ending timestamp, the request further including information specifying a desired service level within which the visualization is to be generated;

determining a plurality of worker nodes required to generate the visualization within the desired service level;

provisioning the plurality of worker nodes and providing instructions to each worker node to cause each worker node to generate a portion of the visualization;

reassembling the portions of the visualization into a final visualization; and providing the final visualization to at least a first user based at least in part on a user interface configuration.

19. The medium of claim 18, wherein the request to generate the visualization of the selected segment of the trip of the vehicle further includes information identifying a user interface configuration, wherein providing the final visualization to the at least first user further includes providing the final visualization based at least in part on the user interface configuration.

20. The medium of claim 19, wherein the information identifying a user interface configuration includes information identifying at least a first frame, the at least first frame displaying a selected type of data associated with the selected segment of the trip of the vehicle.

* * * * *